US012264505B2

(12) United States Patent
Lunday

(10) Patent No.: US 12,264,505 B2
(45) Date of Patent: Apr. 1, 2025

(54) LATCH HOLDBACK WITH ELECTRONIC RELEASE

(71) Applicant: Schlage Lock Company LLC, Carmel, IN (US)

(72) Inventor: Drake Lunday, Colorado Springs, CO (US)

(73) Assignee: Schlage Lock Company LLC, Carmel, IN (US)

( * ) Notice: Subject to any disclaimer, the term of this patent is extended or adjusted under 35 U.S.C. 154(b) by 163 days.

(21) Appl. No.: 17/730,477

(22) Filed: Apr. 27, 2022

(65) Prior Publication Data

US 2023/0349196 A1 Nov. 2, 2023

(51) Int. Cl.

*E05B 63/18* (2006.01)
*E05B 47/00* (2006.01)
*E05B 63/08* (2006.01)

(52) U.S. Cl.

CPC .......... *E05B 63/18* (2013.01); *E05B 47/0002* (2013.01); *E05B 47/0012* (2013.01); *E05B 63/08* (2013.01); *E05B 2047/0016* (2013.01); *E05B 2047/0036* (2013.01)

(58) Field of Classification Search

CPC .. E05B 63/18; E05B 47/0002; E05B 47/0012; E05B 63/08; E05B 2047/0016; E05B 2047/0036

See application file for complete search history.

(56) References Cited

U.S. PATENT DOCUMENTS

| | | | | | |
|---|---|---|---|---|---|
| 3,420,561 | A * | 1/1969 | Armstrong | E05B 63/18 | 292/7 |
| 3,808,849 | A * | 5/1974 | Alexander | E05B 59/00 | 70/DIG. 73 |
| 3,890,608 | A * | 6/1975 | Peterson | E05B 45/06 | 340/545.7 |
| 4,429,556 | A * | 2/1984 | Kambic | E05B 57/00 | 70/472 |
| 4,685,709 | A * | 8/1987 | Kambic | E05B 47/0012 | 292/201 |
| 5,566,991 | A * | 10/1996 | Young | E05B 57/00 | 292/201 |
| 2012/0326456 | A1* | 12/2012 | Picard | G08B 15/005 | 361/752 |
| 2016/0017638 | A1* | 1/2016 | Dore Vasudevan | E05B 55/12 | 292/137 |
| 2016/0145904 | A1* | 5/2016 | Lowder | E05B 47/0001 | 292/145 |
| 2018/0328080 | A1* | 11/2018 | VanMeter | E05B 47/0657 | |
| 2018/0340352 | A1* | 11/2018 | Compton | E05B 47/0046 | |
| 2020/0270918 | A1* | 8/2020 | Bogdanov | E05B 47/0673 | |

* cited by examiner

*Primary Examiner* — Mark A Williams
(74) *Attorney, Agent, or Firm* — Taft Stettinius & Hollister LLP

(57) ABSTRACT

A method for operating a lockset generally includes transmitting an unlock command to an electronic actuator in response to receiving an unlock signal. In response to receiving the unlock command, the electronic actuator performs a first operation, including moving a holdback from a release position to a hold position. In response to actuation of a manual actuator, a latchbolt is moved from an extended position to a retracted position. The holdback in the hold position retains the latchbolt in the retracted position.

19 Claims, 5 Drawing Sheets

LATCH HOLDBACK WITH ELECTRONIC RELEASE

TECHNICAL FIELD

The present disclosure generally relates to access control devices, and more particularly but not exclusively relates to mortise locksets.

BACKGROUND

In some circumstances, it may be desirable to retain a latchbolt of an access control device in a retracted position to thereby facilitate opening of the associated door without requiring that the user actuate the handle. While certain existing locksets provide for such electronic holdback, these solutions typically require the use of an actuator (e.g., a motor or solenoid) that actively retracts the latchbolt before holding the latchbolt in the retracted position. The requirement that the actuator be capable of retracting the latchbolt can lead to the use of larger and more expensive actuators that require relatively large amounts of electrical power. For these reasons among others, there remains a need for further improvements in this technological field.

SUMMARY

An exemplary method pertains to operating a lockset. The method generally includes transmitting an unlock command to an electronic actuator in response to receiving an unlock signal. In response to receiving the unlock command, the electronic actuator performs a first operation, including moving a holdback from a release position to a hold position. In response to actuation of a manual actuator, a latchbolt is moved from an extended position to a retracted position. The holdback in the hold position retains the latchbolt in the retracted position. Further embodiments, forms, features, and aspects of the present application shall become apparent from the description and figures provided herewith.

DETAILED DESCRIPTION OF ILLUSTRATIVE EMBODIMENTS

Figure 1:
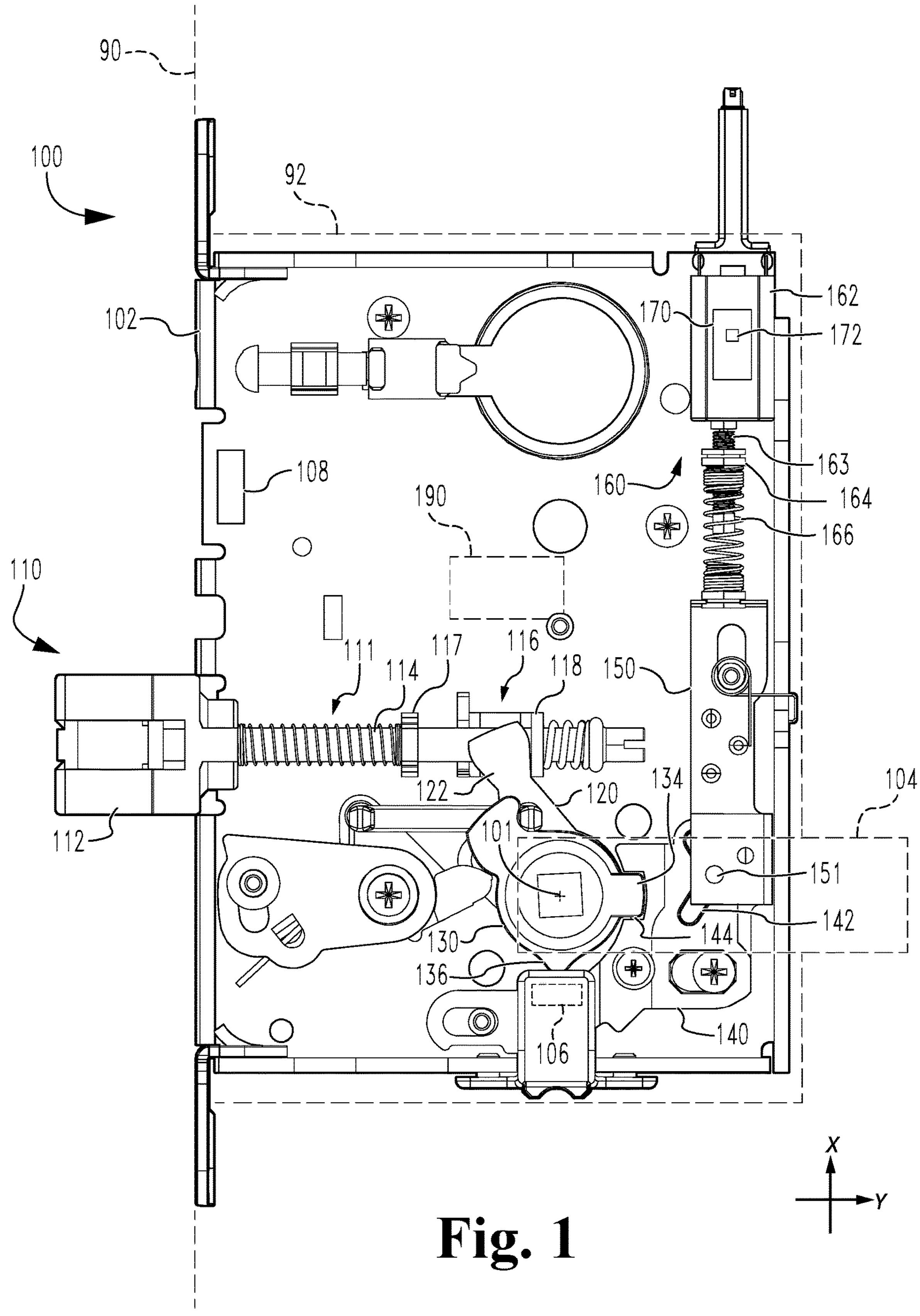
FIG. 1 is a plan view of a lockset according to certain embodiments installed to a door.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" may be used to denote motion or spacing along three mutually perpendicular axes, wherein each of the axes defines two opposite directions. In the coordinate system illustrated in FIG. 1, the X-axis defines first and second longitudinal directions, the Y-axis defines first and second lateral directions, and the Z-axis defines first and second transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. Moreover, the term "transverse" may also be used to describe motion or spacing that is non-parallel to a particular axis or direction. For example, an element that is described as being "movable in a direction transverse to the longitudinal axis" may move in a direction that is perpendicular to the longitudinal axis and/or in a direction oblique to the longitudinal axis. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is a mortise lockset 100 according to certain embodiments. The lockset 100 is configured for mounting in a mortise pocket 92 of a door 90, and generally includes a case 102, a latchbolt 110 movably mounted to the case 102, a retractor 120 operable to retract the latchbolt 110, a hub 130 operable to rotate the retractor 120, a catch 140 operable to selectively prevent rotation of the hub 130, a link 150 operable to laterally move the catch 140 between a locking position and an unlocking position, and an electronic drive mechanism 160 operable to longitudinally drive the link 150 between a lock-setting position and an unlock-setting position, and in the illustrated form further includes control circuitry 170 configured to control operation of the drive mechanism 160. As described herein, the lockset 100 is configured to transition between a locked state and an unlocked state in response to a lock/unlock signal. More particularly, the lockset 100 is configured to transition to the locked state in response to the lock/unlock signal being a lock signal, and to transition to the unlocked state in response to the lock/unlock signal being an unlock signal.

The latchbolt 110 is slidably mounted in the case 102 for lateral movement between an extended position, in which the latchbolt 110 is operable to retain the door 90 in a closed position, and a retracted position, in which the latchbolt 110 is inoperable to retain the door 90 in the closed position. The latchbolt 110 may be biased toward its extended position, for example by a spring 111 engaged with the case 102. The latchbolt 110 generally includes a bolt head 112, a stem 114 extending rearward from the bolt head 112, and a bracket 116 secured to the stem 114. The bracket 116 includes a first flange 117 and a second flange 118, the functions of which are described herein.

The retractor 120 is pivotably mounted in the case 102 for pivotal movement about a rotational axis 101, and is engaged with the bracket 116 such that rotation of the retractor 120 from a home position to a rotated position retracts the latchbolt 110. More particularly, the retractor 120 includes an arm 122 that engages the second flange 118 of the bracket 116 during such rotation of the retractor 120 to thereby drive the latchbolt 110 from its extended position to its retracted position.

The hub 130 is mounted in the case 102 for rotation about the rotational axis 101, and may be rotationally coupled with a handle 104 such that a user is able to rotate the hub 130 by rotating the handle 104. The hub 130 includes a finger 132 operable to engage an extension 124 such that rotation of the hub 130 in an actuating direction (clockwise in FIG. 1) pivots the retractor 120 for retraction of the latchbolt 110. The hub 130 also includes a protrusion 134 operable to engage the catch 140, and may further include a lobe 136 operable to actuate a request-to-exit (REX) sensor 106. While only one hub 130 is visible in the illustration of FIG. 1, it should be appreciated that a second hub may be present for coupling with a second handle on the opposite side of the door 90.

The catch 140 is slidably mounted for lateral movement within the case 102, and generally includes a cam slot 142 through which the catch 140 is engaged with the link 150, and a recess 144 operable to receive the protrusion 134. The cam slot 142 receives a pin 151 coupled to the link 150, and is angled relative to the longitudinal and lateral directions such that the pin 151 laterally drives the catch 140 between its locking position and its unlocking position as the link 150 moves longitudinally between its lock-setting position and its unlock-setting position. When the catch 140 is in its locking position, the protrusion 134 is received in the recess 144 such that the catch 140 prevents rotation of the hub 130, thereby defining a locked state of the lockset 100. When the catch 140 is shifted toward its unlocking position (to the right in FIG. 1), the recess 144 is removed from engagement with the protrusion 134 such that the catch 140 does not prevent rotation of the hub 130, thereby defining an unlocked state of the lockset 100.

In the illustrated form, the hub 130 includes a protrusion 134, and the catch 140 includes a recess 144 operable to receive the protrusion 134. It is also contemplated that these features may be reversed such that the hub 130 includes a recess, and a portion of the catch 140 projects into the recess to selectively lock the hub 130 against rotation.

The link 150 is slidably mounted for longitudinal movement within the case 102, and includes the pin 151, which extends into the cam slot 142. As a result, longitudinal movement of the link 150 between its lock-setting first position and its unlock-setting second position laterally drives the catch 140 between its locking position and its unlocking position as described above.

The electronic drive mechanism 160 is engaged with the link 150, and is operable to longitudinally move the link 150 between its first position and its second position. In the illustrated form, the drive mechanism 160 generally includes a motor 162 having a threaded shaft 163, a driver 164 threaded onto the shaft 163, and a spring 166 having a first end engaged with the driver 164 and an opposite second end engaged with the link 150. The driver 164 is engaged with another component of the lockset 100 (e.g., the case 102) such that rotation of the driver 164 is prevented. As a result, the engaged threads of the shaft 163 and the driver 164 cause driver 164 to move longitudinally in response to rotation of the shaft 163 by the motor 162. This movement of the driver 164 causes the spring 166 to longitudinally urge the link 150 between its first position and its second position. Should the link 150 be blocked from moving to the desired position, the spring 166 will deform, thereby storing mechanical energy that is subsequently released to drive the link 150 to the desired position once the blockage is removed. While the illustrated drive mechanism 160 includes a rotary motor 162 and a driver 164 that converts rotation of the shaft 163 to a linear force on the link 150, it should be appreciated that other forms of drive mechanism may be utilized. As one example, the drive mechanism 160 may instead include a solenoid that drives the link 150 between its first position and its second position.

The control circuitry 170 is configured to control the drive mechanism 160 to lock and unlock the lockset 100 in response to lock/unlock signals. Such lock/unlock signals may, for example, be transmitted by an external device, such as a credential reader, an access control system, and/or a fire safety system. In the illustrated form, the control circuitry 170 includes an energy storage device 172, such as a supercapacitor. When power is introduced to the control circuitry 170, the control circuitry 170 first stores electrical energy in the energy storage device 172, and subsequently operates the drive mechanism 160 to transition the lockset 100 from a default state (i.e., one of the locked state or the unlocked state) to a non-default state (i.e., the other of the locked state or the unlocked state). When the power is subsequently cut, the control circuitry operates the drive mechanism 160 with power stored in the energy storage device 172 to thereby transition the lockset 100 from the non-default state to the default state.

In certain embodiments, the control circuitry 170 may be configurable between an electric locking (EL) mode and an electric unlocking (EU) mode. In the EL mode, the default state is the unlocked state, and the non-default state is the locked state. In other words, the lockset 100 adopts the locked state when power is supplied to the control circuitry 170, and adopts the unlocked state when power is removed from the control circuitry 170. In the EL mode, the presence of the electrical power may be considered to be a lock command, and the absence of power may be considered to be an unlock command. In the EU mode, the default state is the locked state, and the non-default state is the unlocked state. In other words, the lockset 100 adopts the unlocked state when power is supplied to the control circuitry 170, and adopts the locked state when power is removed from the control circuitry 170. In the EU mode, the presence of the electrical power may be considered to be an unlock command, and the absence of power may be considered to be a lock command.

As should be appreciated from the foregoing, the lockset 100 is operable to transition between a locked state and an unlocked state in response to receiving a lock/unlock command (e.g., the presence/absence of electrical power). In response to receiving the lock command, the control circuitry 170 causes the drive mechanism 160 to longitudinally drive the link 150 from its first position to its second position, thereby laterally driving the catch 140 from its unlocking position to its locking position. With the catch 140 in its locking position, rotation of the hub 130 is prevented, and the handle 104 is inoperable to pivot the retractor 120 for retraction of the latchbolt 110. In response to receiving the unlock command, the control circuitry 170 causes the drive mechanism 160 to longitudinally drive the link 150 from its second position to its first position, thereby laterally driving the catch 140 from its locking position to its unlocking position. With the catch 140 in its unlocking position, rotation of the hub 130 is permitted, and the handle 104 is operable to pivot the retractor 120 for retraction of the latchbolt 110.

In certain circumstances, it may be desirable for the lockset 100 to selectively retain the latchbolt 110 in its retracted position. In such forms, the lockset 100 may include a holdback mechanism 190. In certain embodiments, the holdback mechanism 190 may take the form of a mechanical holdback mechanism, for example as described herein with reference to FIGS. 2-4. In certain embodiments, the holdback mechanism 190 may take the form of an electronic holdback mechanism, for example as described herein with reference to FIGS. 7 and 8.

Figure 2:
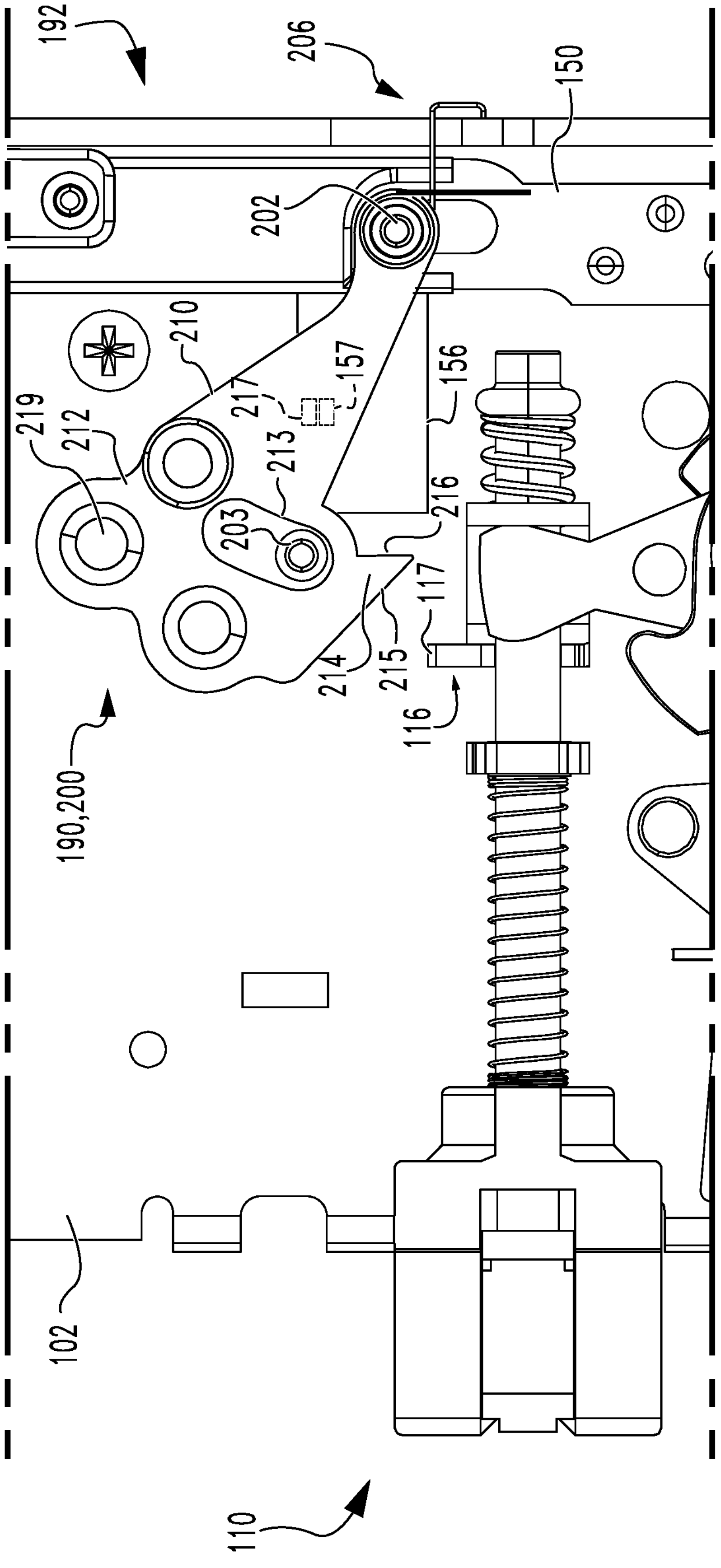
FIG. 2 is a plan view of a lockset including a holdback according to certain embodiments, with the holdback in a release position.

With additional reference to FIG. 2, illustrated therein is a holdback mechanism in the form of a mechanical holdback 200 according to certain embodiments. The mechanical holdback 200 generally includes a pawl 210 that is pivotably mounted within the case 102 for pivotal movement about a pivot pin 202. As described herein, the pawl 210 is pivotable between an undogging or release position and a dogging or hold position to selectively retain the latchbolt 110 in its retracted position.

Figure 3:
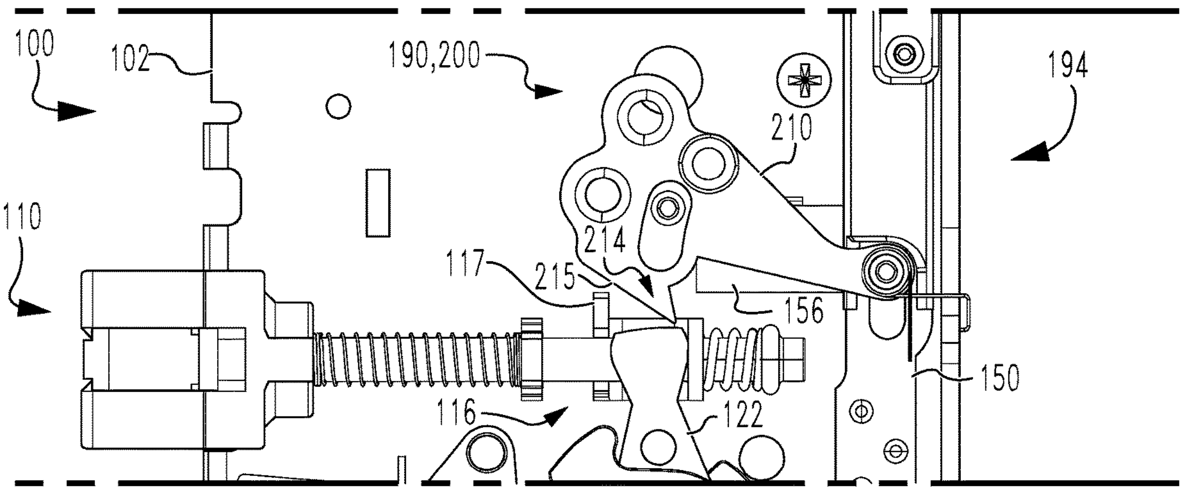
FIG. 3 is a plan view of the lockset illustrated in FIG. 2 with the holdback in a hold position and a latchbolt in an extended position.
Figure 4:
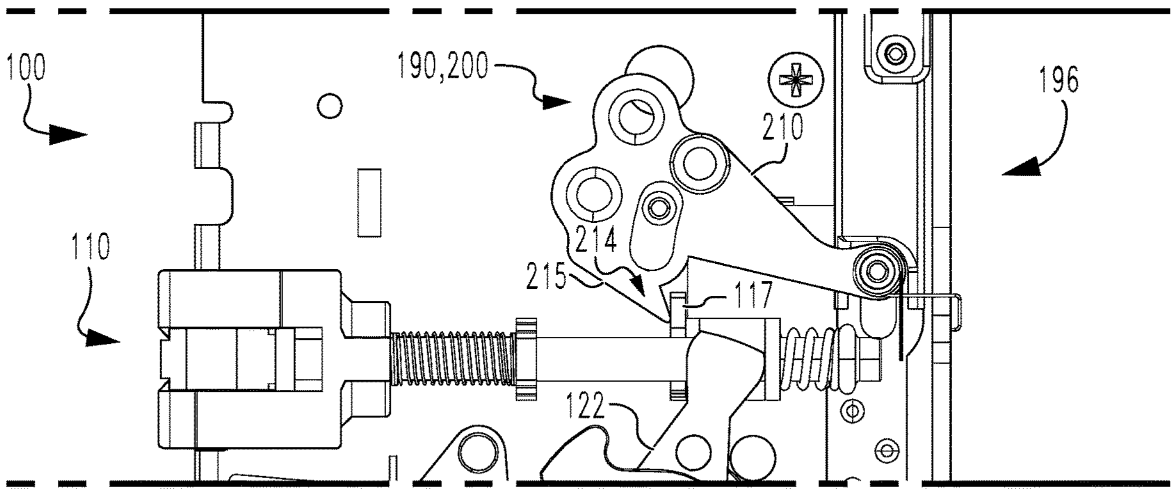
FIG. 4 is a plan view of the lockset illustrated in FIG. 2 with the holdback in a hold position and a latchbolt in a retracted position.

The pawl 210 includes a body portion 212 having a guide slot 213 defined therein, and a pin 203 extends into the guide slot 213 to thereby limit the pawl 210 to pivotal movement between its release position (FIG. 2) and its hold position (FIGS. 3 and 4). The pawl 210 also includes a tang 214, which includes a ramp 215 and a holding edge 216 opposite the ramp 215. As described herein, the link 150 is operable to move the pawl 210 from its hold position to its release position. In certain embodiments, the pawl 210 may further include a projection 217 operable to engage a corresponding projection 157 on an arm 156 of the link 150. In the illustrated form, the pawl 210 is mounted to the mortise case 102 for pivotal movement between its hold position and its release position. It is also contemplated that the pawl 210 may be mounted for another type of movement between its hold position and its release position. For example, the pawl 210 may be slidably mounted in the case for translational movement between its hold position and its release position.

In certain forms, the pawl 210 may be biased toward its dogging or hold position. As one example, a bias member 206 may be engaged between the pawl 210 and the case 102 to thereby bias the pawl 210 toward its dogging position. While the illustrated bias member 206 is provided in the form of a torsion spring, it is also contemplated that another form of bias member may be utilized, such as an extension spring, a compression spring, a leaf spring, an elastic member, and/or magnets. In certain embodiments, the pawl 210 may be biased toward its dogging position by gravity.

FIG. 2 illustrates the lockset 100 in a locked state 192, in which the link 150 holds the pawl 210 in its release position. More particularly, the link projection 157 engages the pawl projection 217 to thereby hold the pawl 210 in the release position against the force of the bias member 206, and the link 150 holds the catch 140 in its locking position as described above. As described herein, movement of the link 150 from its lock-setting position to its unlock-setting position moves the catch 140 from its locking position to its unlocking position, and also causes movement of the pawl 210 from its release position to its hold position.

With additional reference to FIG. 3, illustrated therein is a portion of the lockset 100 while the lockset 100 is in an unlocked state 194 and prior to retraction of the latchbolt 110. Movement of the link 150 from the lock-setting position to the unlock-setting position has driven the catch 140 to its locking position and enabled movement of the pawl 210 to its dogging or hold position. In the illustrated form, the lock-setting position of the link 150 is an upper position, the unlock-setting position is a lower position, and the link directly engages the pawl 210 such that the lock-setting position of the link 150 is correlated with the release position of the pawl 210 and the unlock-setting position of the link

150 is correlated with the hold position of the pawl 210. It is also contemplated that the lock-setting position may be a lower position and the unlock-setting position may be an upper position. In such forms, the link 150 may engage the pawl 210 through a lever that causes the pawl 210 to lower to its hold position in response to raising of the link 150.

In the unlocked state 194 illustrated in FIG. 3, the lockset 100 has been unlocked, but the handle 104 has not yet been rotated to retract the latchbolt 110. In this unlocked state 194, the ramp 215 of the pawl 210 is positioned in the path along which the first flange 117 travels during retraction of the latchbolt 110. Thus, when the latchbolt 110 is driven to its retracted position (FIG. 4), the flange 117 engages the ramp 215 and urges the pawl 210 against the biasing force urging the pawl 210 toward its hold position. As the flange 117 clears the nose of the tang 214, the biasing force returns the pawl 210 to its hold position, where the holding edge 216 engages the first flange 117 and retains the latchbolt 110 in its retracted position.

With additional reference to FIG. 4, illustrated therein is the lockset 100 in a dogged state 196, in which the lockset 100 is unlocked, the handle 104 has been rotated to retract the latchbolt 110, and the pawl 210 has returned to its dogging or hold position to retain the latchbolt 110 in its retracted position. With the pawl 210 preventing extension of the latchbolt 110, the handle 104 may be released and returned to its home position without causing a corresponding extension of the latchbolt 110. The latchbolt 110 is thus dogged in its retracted position, and the door 90 is capable of being opened and closed without actuating the handle 104.

As should be appreciated from the foregoing, the holdback 200 is configured to dog the latchbolt 110 in its retracted position for so long as the link 150 remains in its unlock-setting position. When the link 150 is subsequently moved to its lock-setting position (e.g., by the control circuitry 170), the link 150 returns the pawl 210 to its release position, thereby permitting the latchbolt 110 to return to its extended position (e.g., under the force of the return spring 114).

It should also be appreciated that although the pawl 210 is electronically moved between its hold position and its release position (e.g., by the drive mechanism 160 under control of the control assembly 170), the illustrated mechanical holdback 200 requires no electrical power to remain in the appropriate position. Stated another way, the holdback 200 can continue to dog the latchbolt 110 until an electrical locking command is provided to the drive assembly 160 for locking of the lockset 100.

As noted above, the control circuitry 170 may transmit a locking command in response to receiving a locking signal (e.g., from an external device). In certain embodiments, the locking signal may be transmitted in response to a fire condition. For example, an access control system may transmit the unlocking signal (e.g., electrical power) in response to one or more first criteria (e.g., absence of a fire condition), and may transmit the locking signal (e.g., cessation of electrical power) in response to one or more second criteria (e.g., presence of a fire condition). In such forms, the dogging of the latchbolt 110 may be released in response to a fire signal, thereby causing the latchbolt 110 to project in the event of a fire. This holdback release in response to a fire signal may aid in improving performance of the lockset 100 for fire certification.

Figure 5:
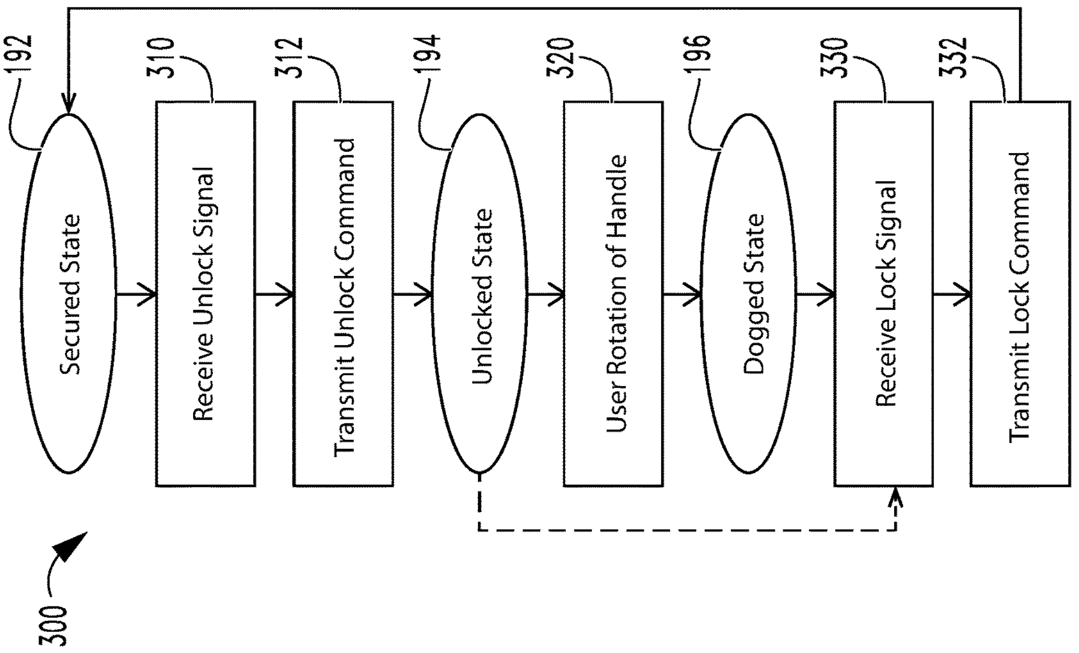
FIG. 5 is a schematic flow diagram of a process according to certain embodiments.

With additional reference to FIG. 5, illustrated therein is an exemplary process 300 that may be performed using the lockset 100 including the mechanical holdback 200. Blocks illustrated for the processes in the present application are understood to be examples only, and blocks may be combined or divided, and added or removed, as well as reordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 300 is described herein with specific reference to the lockset 100 illustrated in FIGS. 1-4, it is to be appreciated that the process 300 may be performed with locksets having additional and/or alternative features.

The process 300 may begin with the lockset 100 in a secured state, such as the secured state 192 illustrated in FIG. 2. In the secured state 192, the latchbolt 110 is in its extended position, the catch 140 is in its locking position, and the link 150 is in its lock-setting position, in which the link 150 holds the pawl 210 in its release position. In this secured state 192, the user cannot open the door 90 by rotating the outside handle 104, which is locked against rotation by engagement of the catch 140 with the hub 130.

With the lockset 100 in the secured state 192, the lockset 100 may receive an unlock signal in block 310. The unlock signal may, for example, be provided in the form of an electrical current being supplied to the lockset 100. In response to receiving the unlock signal, the control circuitry 170 transmits the unlock command in block 312, thereby causing the lockset 100 to transition to the unlocked state 194 as described above. Thus, the lockset 100 transitions to an unlocked state 194 in response to receiving the unlock signal.

Should a user rotate the handle 104 while the lockset 100 is in the unlocked state 194 and prior to the receipt of a lock signal, the process 300 may proceed to block 320, in which the lockset 100 receives a user rotation of the handle 104. Such rotation of the handle 104 drives the latchbolt 110 to its retracted position and causes the pawl 210 to engage the bracket 116 and dog the latchbolt 110 as described above. The lockset 100 thereby enters the dogged state 196 illustrated in FIG. 4.

With the lockset 100 in the dogged state 196, the lockset 100 may receive the lock signal in block 330. The lock signal may, for example, be provided in the form of a cessation of the current that is interpreted as the unlock signal. In response to receiving the lock signal while the lockset 100 is in the dogged state 196, the control circuitry 170 transmits a lock command in block 332. The lock command causes the drive mechanism 160 to move the link 150 to its lock-setting position (e.g., using power stored in the energy storage device 172). Movement of the link 150 to its lock-setting position moves the catch 140 to its locking position and moves the pawl 210 to its release position, thereby releasing the latchbolt 110 and returning the lockset 100 to the secured state 192.

While the lockset 100 is capable of transitioning from the dogged state to the secured state, the lockset 100 is also capable of transitioning directly from the unlocked state to the secured state. For example, if the lock signal is received in block 320 prior to rotation of the handle 104, the process 300 may proceed from block 312 to block 330, as indicated by the dashed flowpath.

In certain circumstances, it may be desirable to effectively disable the holdback function of the lockset 100. In some such circumstances, it may be desirable to mechanically disable the holdback functionality. For example, a fastener (e.g., a pin or screw) may be inserted into an aperture 219 in the pawl 210 through an aperture in the case 102 to thereby retain the pawl 210 in the release position. It is also contemplated that the holdback function may be effectively disabled electronically. An example process for such electronic disabling will now be described with reference to FIG. 6.

Figure 6:
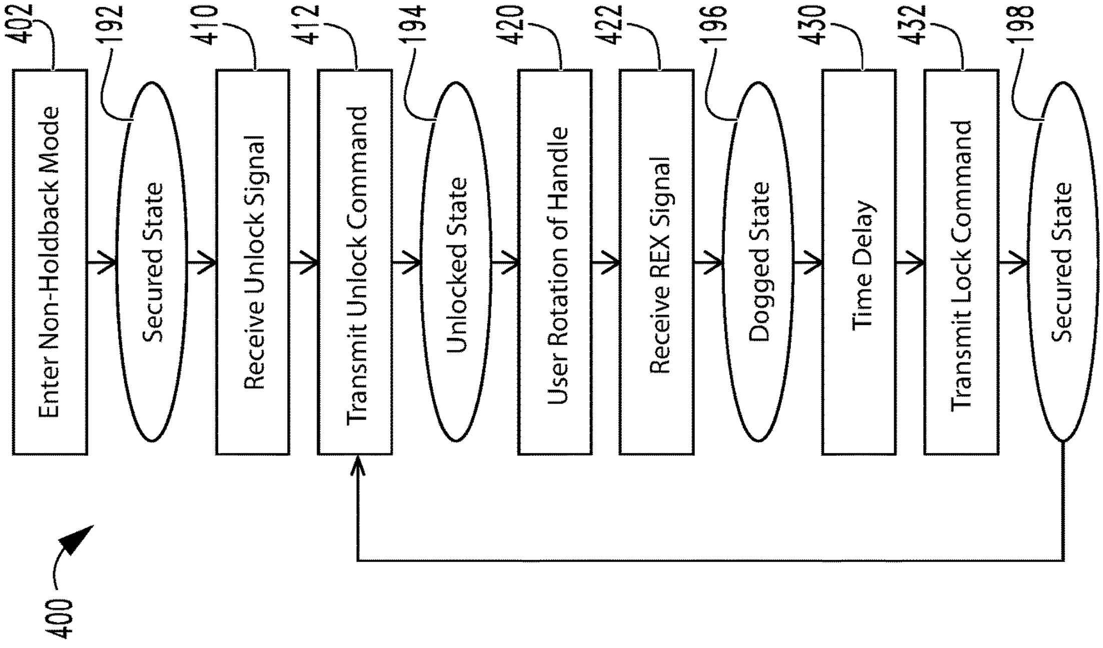
FIG. 6 is a schematic flow diagram of a process according to certain embodiments.

With additional reference to FIG. 6, illustrated therein is an exemplary process 400 that may be performed using the lockset 100 including the mechanical holdback 200. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 400 is described herein with specific reference to the lockset 100 illustrated in FIGS. 1-4, it is to be appreciated that the process 400 may be performed with locksets having additional and/or alternative features.

The process 400 may begin with block 402, which generally involves placing the lockset 100 in a non-holdback mode. Block 402 may, for example, involve flipping a physical switch of the lockset 100, transmitting an electronic command to the control circuitry 170, or causing the lockset 100 to enter the non-holdback mode in another manner. In the non-holdback mode, the lockset 100 may begin operation in the secured state 192. In the secured state 192, the latchbolt 110 is in its extended position, the catch 140 is in its locking position, and the link 150 is in its lock-setting position, in which the link 150 holds the pawl 210 in its release position. In this secured state 192, the user cannot open the door 90 by rotating the outside handle 104, which is locked against rotation by engagement of the catch 140 with the hub 130.

With the lockset 100 in the secured state 192, the lockset 100 may receive an unlock signal in block 410. The unlock signal may, for example, be provided in the form of an electrical current being supplied to the lockset 100. In response to receiving the unlock signal, the control circuitry 170 transmits the unlock command in block 412, thereby causing the lockset 100 to transition to the unlocked state 194 as described above. Thus, the lockset 100 transitions to an unlocked state 194 in response to receiving the unlock signal.

Should a user rotate the handle 104 while the lockset 100 is in the unlocked state 194 and prior to the receipt of a lock signal, the process 400 may proceed to block 420, in which the lockset 100 receives a user rotation of the handle 104. Such rotation of the handle 104 drives the latchbolt 110 to its retracted position and causes the pawl 210 to engage the bracket 116 and dog the latchbolt 110 as described above. The lockset 100 thereby enters the dogged state 196 illustrated in FIG. 4. Rotation of the handle 104 also causes the hub 130 to actuate the REX sensor 106, thereby causing the REX sensor 106 to transmit a REX signal that is received by the control circuitry 170 in block 422.

In response to receiving the REX signal in block 422, the control circuitry 170 may institute a time delay in block 430. The time delay may, for example, be on the order of one to ten seconds, or about five seconds in duration. Following expiration of the time delay, the control circuitry 170 may transmit the lock command in block 432, thereby causing the lockset 100 to transition to the secured state 196. Following the transition to the secured state 196, the process 400 returns to block 412, in which the control circuitry 170 once again transmits the unlock command to thereby transition the lockset 100 to the unlocked state 194. The lockset 100 may remain in the unlocked state 194 until a user rotates the handle 104 to cause the process 400 to continue to block 420, or until a lock signal is received. If the control circuitry 170 receives the lock signal at any point during the process 400, the control circuitry 170 may transmit the lock command to thereby transition the lockset 100 to the secured state 192.

It should be appreciated from the foregoing that when the lockset 100 is operating in the non-holdback mode, the user may not necessarily perceive any difference in the operation of the lockset 100 as compared to a standard lockset that does not include holdback functionality. More particularly, the lockset 100 may function substantially as a standard privacy function lockset, in which the latchbolt is not typically dogged.

In certain embodiments, the lockset 100 may be provided with or be in communication with a door position sensor 108 operable to sense when the door 90 is in its closed position. Such a door position sensor 108 may, for example, take the form of a magnetic switch or sensor that is actuated by a magnet mounted in the doorframe. It is also contemplated that the door position sensor 108 may take another form, such one including a mechanical sensor, an optical sensor, or another form of sensor (e.g., switch). In such forms, the control circuitry 170 may be configured (e.g., programmed) to dog the latchbolt 110 for a predetermined number of door openings, and to transition the lockset 100 to either the unlocked state 194 or the secured state 192 after the predetermined number of door openings have been completed.

As should be evident from the foregoing, the illustrated embodiment of the lockset 100 does not require that the latchbolt 110 be electronically retracted (e.g., by a motor or solenoid), and may instead rely on a manual actuation to retract the latchbolt 110. Following such manual retraction of the latchbolt 110, the mechanical holdback 200 dogs the latchbolt 110 in its retracted position without requiring electrical energy. As a result, the power consumption requirements of the lockset 100 may be reduced in comparison to embodiments that utilize electric latch retraction and/or electronic holdback mechanisms.

Figure 7:
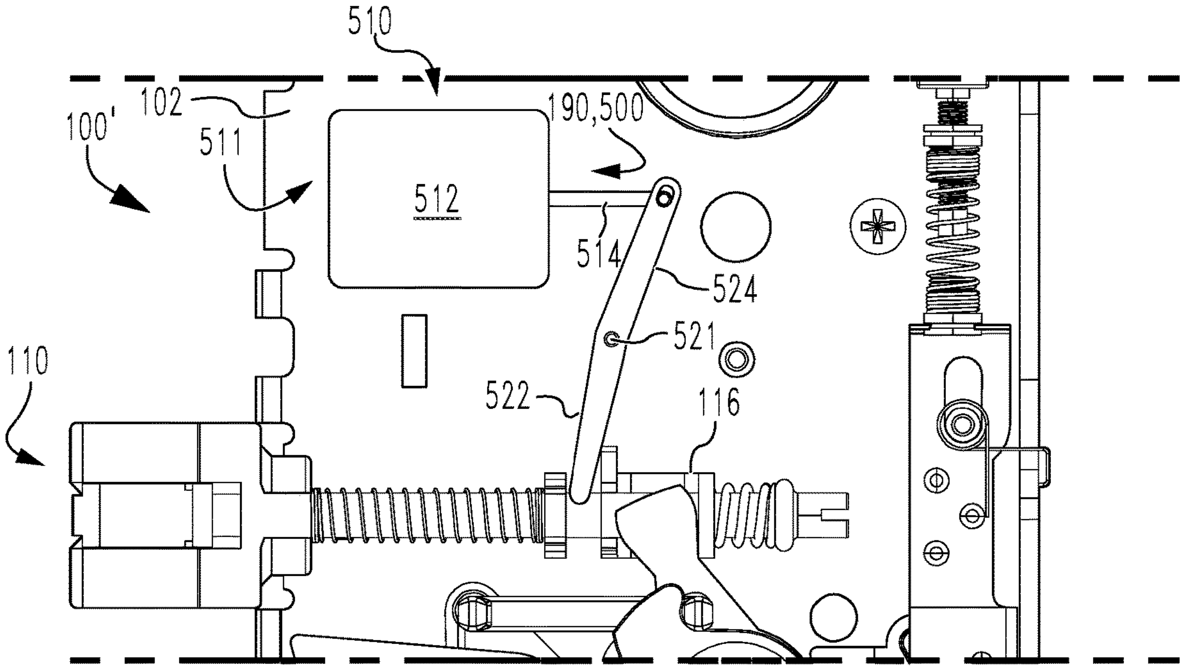
FIG. 7 is a plan view of a lockset including a holdback according to certain embodiments, with the holdback in a release position.
Figure 8:
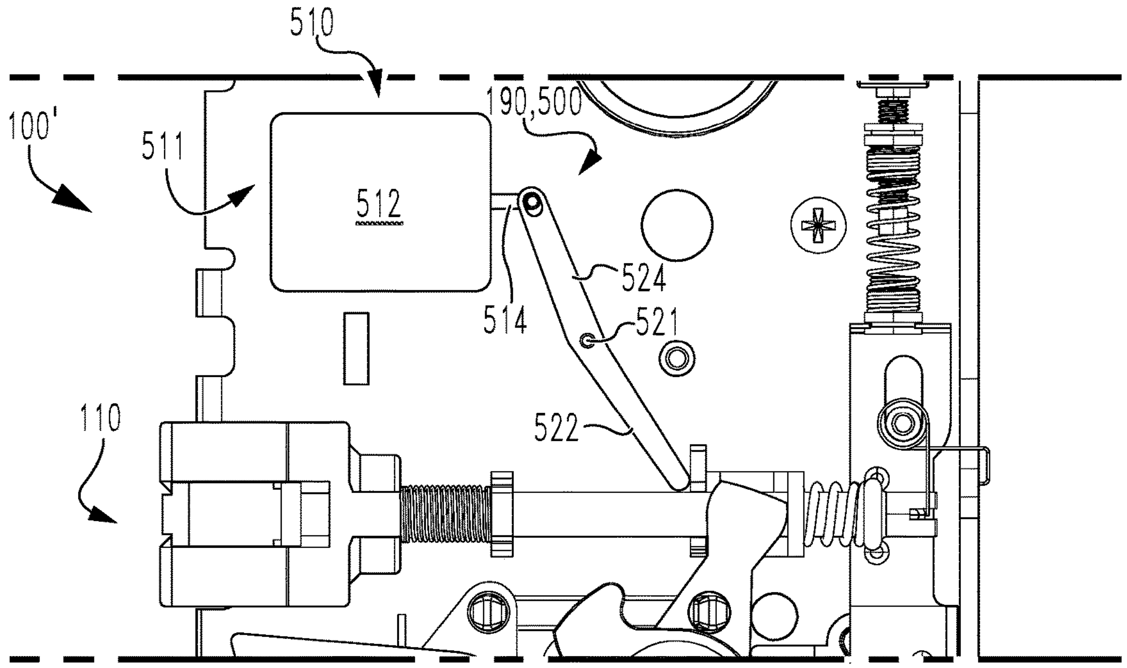
FIG. 8 is a plan view of the lockset illustrated in FIG. 7, with the holdback in a hold position.

With additional reference to FIGS. 7 and 8, illustrated therein is a lockset 100' according to certain embodiments. The lockset 100' is substantially similar to the above-described lockset 100. In the illustrated form, however, the holdback mechanism 190 is provided in the form of an electronic holdback 500. The electronic holdback 500 generally includes a driver 510 and a lever 520 engaged with the driver 510. As described herein, the driver 510 is in communication with the control circuitry 170, and is configured to move the lever 520 between an undogging or release position (FIG. 7) and a dogging or hold position (FIG. 8) to selectively electronically retain the latchbolt 110 in its retracted position.

The driver 510 is an electronically-actuated driver, and in the illustrated form is provided in the form of a solenoid 511 having a core 512 and a plunger 514. When the solenoid 511 is provided with electrical power, the plunger 514 moves from a default position (FIG. 7) to a non-default position (FIG. 8). In the illustrated form, the default position is a projected position, and the non-default position is a retracted position. It is also contemplated that the electronic holdback 500 may be configured in another manner, such as one in which the default position is a retracted position and the non-default position is an extended position. Moreover, while the illustrated driver 510 is provided in the form of a solenoid, it should be appreciated that another forms of driver may be utilized, such as a linear motor.

The lever 520 is pivotably mounted to the case 102 via a pivot 521, and includes a first arm 522 operable to engage the latchbolt 110 and a second arm 524 engaged (e.g., pivotably coupled) with the plunger 514. In certain embodiments, the second arm 524 may be longer than the first arm 522 to provide the driver 510 with a mechanical advantage that reduces the power needed to hold the lever 520 in its hold position against the biasing forces urging the latchbolt 110 to return to its extended position.

When power is applied to the lockset 100' to thereby transition the lockset 100' to the unlocked state, the driver 510 is supplied with power to thereby retract the plunger 514 and urge the lever 520 toward its hold position. In certain embodiments, the force provided by the driver 510 may be sufficient to drive the latchbolt 110 to its retracted position without requiring that the user rotate the handle 104. In other embodiments, the force provided by the driver 510 is insufficient to electronically move the latchbolt 110 to its retracted position without actuation of the handle 104. In either case, the force provided by the driver 510 is sufficient to cause the lever 520 to retain the latchbolt 110 in its retracted position once the latchbolt 110 has been retracted.

It should be evident from the foregoing that the electronic holdback 500 is configured to retain the latchbolt 110 in its retracted position while power is supplied to the driver 510. Moreover, when a lock signal (e.g., cessation of electrical power) is received by the lockset 100', the control circuitry 170 ceases providing the solenoid 512 with power, thereby causing the electronic holdback 500 to release the latchbolt 110 for return to its extended position.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A mortise lockset, comprising:

a mortise case;

a latchbolt mounted in the mortise case for movement between an extended position and a retracted position;

a hub rotatably mounted in the mortise case for movement between a home position and a rotated position;

a retractor configured to retract the latchbolt in response to rotation of the hub from the home position to the rotated position;

a holdback having a hold position and a release position, wherein the holdback in the hold position is operable to retain the latchbolt in the retracted position, and wherein the holdback in the release position is inoperable to retain the latchbolt in the retracted position;

an electronic actuator engaged with the holdback, wherein the electronic actuator is configured to drive the holdback from the release position to the hold position in response to an unlocking command, and wherein the electronic actuator is configured to drive the holdback from the hold position to the release position in response to a locking command; and control circuitry configured to perform an unlocking operation in response to an unlocking signal, and to perform a locking operation in response to a locking signal;

wherein the unlocking operation comprises transmitting to the electronic actuator the unlocking signal, thereby causing the electronic actuator to move the holdback from the release position to the hold position; and wherein the locking operation comprises transmitting to the electronic actuator the locking signal, thereby causing the electronic actuator to move the holdback from the hold position to the release position.

2. The mortise lockset of claim 1, further comprising a catch operable to selectively prevent rotation of the hub from the home position, the catch having a locking position in which the catch retains the hub in the home position, the catch having an unlocking position in which the catch permits rotation of the hub from the home position;

wherein the unlocking operation further comprises moving the catch from the locking position to the unlocking position; and wherein the locking operation further comprises moving the catch from the unlocking position to the locking position.

3. The mortise lockset of claim 1, wherein the holdback is biased toward the hold position.

4. The mortise lockset of claim 3, wherein the holdback comprises a tang including a ramp and a holding edge opposite the ramp; and wherein, during retraction of the latchbolt with the holdback in the hold position, a portion of the latchbolt engages the ramp and urges the holdback toward the release position until the portion clears the tang, after which the holdback returns to the hold position and the holding edge engages the latchbolt to thereby retain the latchbolt in the retracted position.

5. The mortise lockset of claim 1, wherein the electronic actuator comprises a rotary motor.

6. The mortise lockset of claim 1, wherein the electronic actuator comprises a solenoid.

7. A lockset, comprising:

a latchbolt having an extended position and a retracted position;

a holdback having a hold position, in which the holdback is operable to retain the latchbolt in the retracted position, and a release position, in which the holdback is inoperable to retain the latchbolt in the retracted position; and an electronic actuator operable to transition the lockset between an unlocked state, in which a manual actuator is operable to retract the latchbolt, and a locked state, in which the manual actuator is inoperable to retract the latchbolt; and wherein the holdback is configured to move between the hold position and the release position in response to the electronic actuator transitioning the lockset between the unlocked state and the locked state.

8. The lockset of claim 7, wherein the holdback is configured to move to the hold position in response to the electronic actuator transitioning the lockset to the unlocked state, and to move to the release position in response to the electronic actuator transitioning the lockset to the locked state.

9. The lockset of claim 7, wherein the lockset is inoperable to electronically retract the latchbolt.

10. The lockset of claim 7, wherein the holdback in the hold position is operable to retain the latchbolt in the retracted position without causing the lockset to consume power.

11. The lockset of claim 7, wherein the holdback comprises a tang including a ramp and a holding edge; and wherein, during retraction of the latchbolt with the holdback in the hold position, a portion of the latchbolt engages the ramp and urges the holdback toward the release position until the portion clears the tang, after which the holdback returns to the hold position and the holding edge engages the latchbolt to thereby retain the latchbolt in the retracted position.

12. A method of operating the lockset of claim 7, the method comprising:

in response to receiving an unlock signal, transmitting an unlock command to the electronic actuator;

performing, by the electronic actuator and in response to receiving the unlock command, a first operation, wherein the first operation comprises moving the holdback from the release position to the hold position;

in response to actuation of the manual actuator, moving the latchbolt from the extended position to the retracted position; and retaining, by the holdback in the hold position, the latchbolt in the retracted position.

13. The method of claim 12, wherein the first operation further comprises transitioning the lockset from the locked state to the unlocked state, thereby permitting retraction of the latchbolt by the manual actuator.

14. The method of claim 12, further comprising:

in response to receiving a lock signal, transmitting a lock command to the electronic actuator;

performing, by the electronic actuator and in response to receiving the lock command, a second operation, wherein the second operation comprises moving the holdback from the hold position to the release position; and in response to movement of the holdback from the hold position to the release position, returning the latchbolt to the extended position.

15. The method of claim 14, wherein the second operation further comprises transitioning the lockset from the unlocked state to the locked state, thereby preventing retraction of the latchbolt by the manual actuator.

16. The method of claim 12, wherein the holdback in the hold position is operable to retain the latchbolt in the retracted position without consuming electrical power.

17. The method of claim 12, wherein the holdback comprises a tang including a ramp and a holding edge; and wherein the method further comprises, during retraction of the latchbolt, engaging a portion of the latchbolt with a ramp of the holdback, thereby urging the holdback toward the release position until the portion clears the tang, after which the holdback returns to the hold position and the holding edge engages the latchbolt to thereby retain the latchbolt in the retracted position.

18. The method of claim 12, further comprising:

receiving a request to exit signal indicative of actuation of the manual actuator; and in response to receiving the request to exit signal:

performing a second operation comprising moving the holdback to the release position, thereby permitting return of the latchbolt to the extended position; and subsequently repeating the first operation to thereby move the holdback to the hold position.

19. The method of claim 18, further comprising instituting a delay of a predetermined duration between receiving the request to exit signal and performing the second operation.

* * * * *